US012312196B2

(12) United States Patent
Liu

(10) Patent No.: US 12,312,196 B2

(45) Date of Patent: May 27, 2025

(54) WRAPPER CUTTER

(71) Applicant: Yong Liu, Zhejiang (CN)

(72) Inventor: Yong Liu, Zhejiang (CN)

( * ) Notice: Subject to any disclaimer, the term of this patent is extended or adjusted under 35 U.S.C. 154(b) by 0 days.

(21) Appl. No.: 18/900,990

(22) Filed: Sep. 30, 2024

(65) Prior Publication Data

US 2025/0019199 A1 Jan. 16, 2025

Related U.S. Application Data

(63) Continuation of application No. 18/119,848, filed on Mar. 10, 2023.

(51) Int. Cl.
*B65H 35/06* (2006.01)
*B26D 7/14* (2006.01)

(52) U.S. Cl.
CPC ............... *B65H 35/06* (2013.01); *B26D 7/14* (2013.01); *B65H 2301/122* (2013.01); *B65H 2701/1944* (2013.01)

(58) Field of Classification Search
CPC ... B65H 2701/1944; B26B 3/08; B26B 29/06; B26D 7/14
USPC .............................. 30/280; D18/34.3; D8/98
See application file for complete search history.

(56) References Cited

U.S. PATENT DOCUMENTS

| | | | | |
|---|---|---|---|---|
| 3,824,688 A * | 7/1974 | Goffe | B43M 7/002 30/294 |
| 8,171,647 B2 * | 5/2012 | Gullicks | B26B 3/00 30/294 |
| 10,813,509 B2 | 10/2020 | Deleon | |
| 11,465,430 B2 | 10/2022 | Guo et al. | |
| 11,717,977 B1 * | 8/2023 | Xie | B26B 3/08 30/278 |
| 12,091,276 B1 * | 9/2024 | Liu | B26D 7/14 |
| 2017/0053500 A1 | 2/2017 | Janot | |
| 2023/0039376 A1 | 2/2023 | Moroyama | |
| 2023/0042565 A1 * | 2/2023 | Perla | B65H 35/06 |

OTHER PUBLICATIONS

Pini, V. et al. How two-dimensional bending can extraordinarily stiffen thin sheets. Sci. Rep. 6, 29627; doi: 10.1038/srep29627 (2016).*

* cited by examiner

*Primary Examiner* — Evan H Macfarlane

(57) ABSTRACT

A wrapper cutter, including a shell having an axially penetrating hollow structure, an elongated slit extending along an axial direction further provided on one side edge of the shell, a cutting knife fixedly mounted on an inner bottom wall of the elongated slit; and a vertical plate arranged on an outer wall of the shell. The vertical plate extends along a circumferential direction of the shell and at least partially covers the elongated slit.

11 Claims, 17 Drawing Sheets

WRAPPER CUTTER

CROSS REFERENCE TO RELATED APPLICATIONS

This is a continuation of U.S. patent application Ser. No. 18/119,848 filed on Mar. 10, 2023, the contents of which are incorporated herein by reference in their entirety.

TECHNICAL FIELD

The present disclosure relates to the technical field of cutters, and in particular, to a wrapper cutter.

BACKGROUND

When cutting rolled wrapping paper, scissors or utility knives are generally used. However, it is difficult to cut rolled wrapping paper in a straight line using scissors or utility knives, leading to the emergence of wrapper cutters on the market. However, the wrapper cutters available on the market are all deigned with a cylindrical simple structure and provide poor cutting results. They cannot ensure nice cutting of paper, and the cut edges are often uneven. Traditional wrapper cutters may cause the paper to deviate from a preset cutting trajectory during the cutting process, thereby affecting cutting accuracy.

SUMMARY

A wrapper cutter, including: a shell having an axially penetrating hollow structure; an elongated slit, extending from a first end of the shell along an axial direction thereof, and formed between a first side edge and a second side edge of the shell; a cutting knife, fixedly arranged within the elongated slit, wherein a blade of the cutting knife faces the first end of the shell, and the cutting knife is configured to cut a section of paper passing through the elongated slit from the first end of the shell; a vertical plate, arranged on an outer wall of the shell, extending along a circumferential direction of the shell, and at least partially covering the elongated slit to allow a gap formed between the vertical plate and the elongated slit for the section of paper to pass through. The vertical plate is capable of bending the section of paper passing through the elongated slit into an arc-shaped surface such that the section of paper reaches a maximum stiffness and tension before reaching the blade of the cutting knife.

BRIEF DESCRIPTION OF THE DRAWINGS

The description and drawings that constitute a part of the present disclosure are provided for a further understanding of the present disclosure. The illustrative embodiments and their descriptions are provided for explanation but do not constitute improper limitations on the present disclosure.

DETAILED WAY

Figure 1:
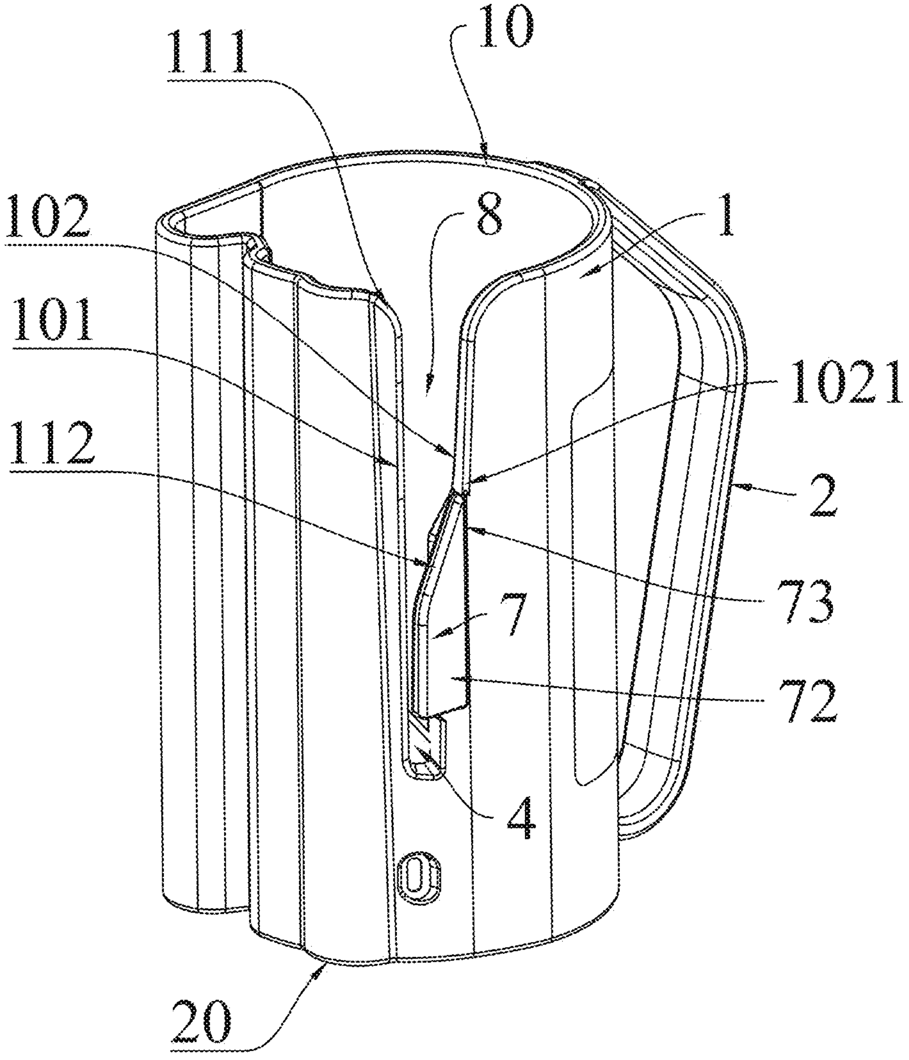
FIG. 1 is an overall schematic view of a wrapper cutter according to embodiment 1.

The present disclosure may be described in detail below with reference to the accompanying drawings and in conjunction with various embodiments. Each example is provided to explain but not limit the present disclosure. In fact, it may be clear to those of ordinary skill that modifications and variations may be made without departing from the scope or spirit of the present disclosure. For example, a feature shown or described as part of one embodiment may be used according to another embodiment to produce yet another embodiment. Therefore, it is intended that the present disclosure includes such modifications and variations within the scope of the appended claims and their equivalents.

In the description of the present disclosure, the terms "longitudinal", "lateral", "upper", "lower", "front", "back", "left", "right", "vertical", "horizontal", "top", "bottom" and the like indicate the orientational or positional relationship based on the orientational or positional relationship illustrated in the drawings, which is only for the convenience of describing and does not require the present disclosure to be constructed and operated in a specific orientation, and therefore cannot be understood as limiting the present disclosure. The terms "connected", "connecting" and "arranged" used in the present disclosure should be understood in a broad sense. For example, it may be a fixed connection or a detachable connection; it may be directly connected or indirectly connected through an intermediate component; it may also be a wired electrical connection, a radio connection, or a wireless signal connection. For those of ordinary skill in the art, the specific meanings of the above terms may be understood according to the specific circumstances.

One or more examples of the present disclosure are illustrated in the attached drawings. Numbers and letter signs are used in the detailed description to refer to features in the drawings. Similar signs in the drawings and descriptions have been configured to refer to similar parts of the present disclosure. As used herein, the terms "first", "second" and "third" are used interchangeably to distinguish one component from another and are not intended to indicate the position or importance of individual components.

Embodiment 1

Figure 2:
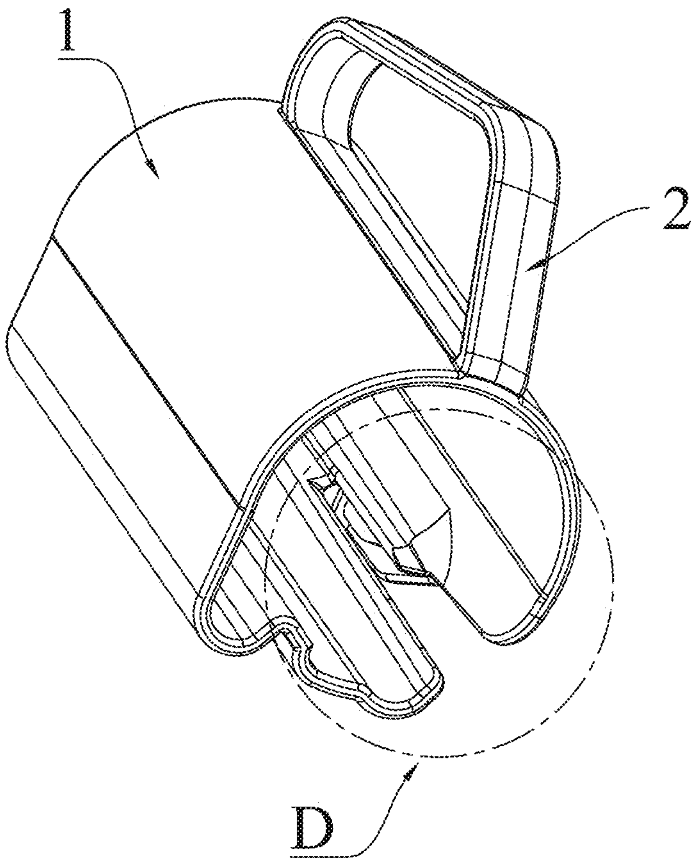
FIG. 2 is an internal schematic view of a shell of a wrapper cutter according to embodiment 1.
Figure 3:
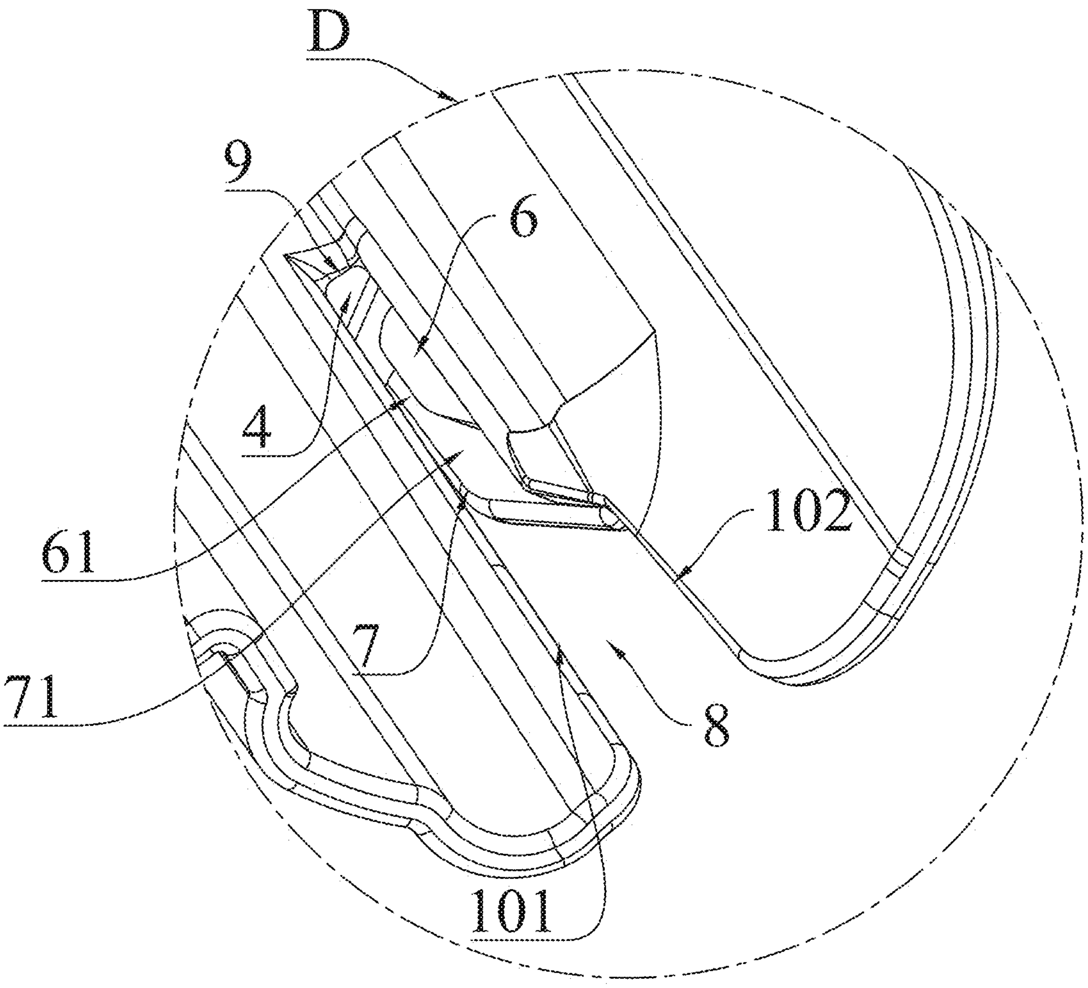
FIG. 3 is an enlarged schematic view of an elongated slit in area D of FIG. 2.

As shown in FIG. 1 to FIG. 3, a wrapper cutter provided by the present disclosure includes a shell 1 having a penetrating hollow structure running axially thereof, an elongated slit 8 defined by the shell 1, and a cutting knife 4 fixedly mounted within one end of the elongated slit 8. The elongated slit 8 extends axially from a first end 10 of the shell 1 to a second end 20 and does not completely run through to the second end 20. Two sides of the shell 1 defining the elongated slit 8 are a first side edge 101 and a second side edge 102. The axial extension characteristics of the elongated slit 8 help guide a section of paper 300 to move along a predetermined path, reduce the deviation of the section of paper 300, and position the section of paper 300 before cutting to ensure the accuracy of the cutting position. The partial pierced structure helps maintain the strength of the shell 1 and avoids structural weakness that may be caused by a complete pierced elongated slit. The section of paper 300 of the wrapping paper can be inserted into the elongated slit 8 and can run to the cutting knife 4 for cutting. The cutting knife 4 is installed inside the shell 1. The shell 1 is defined with a bottom wall groove 9, and the cutting knife 4 is fixedly embedded into the bottom wall groove 9 with a blade of the cutting knife 4 exposed outwardly. The blade of the cutting knife 4 is only exposed outward at an end portion of the elongated slit 8, avoiding the risk of accidental contact with the blade if arranged at other positions of the elongated slit 8, thereby improving the safety of use. The position of the cutting knife is ensured to be stable, which helps to improve the cutting accuracy.

The section of paper 300 can run smoothly to the cutting knife, reducing the obstruction of the section of paper 300 during the cutting process and improving the cutting efficiency. The cutting knife 4 is fixedly installed in the bottom wall groove 9 of the shell 1, which is convenient for the maintenance and replacement of the cutting knife and reduces the maintenance cost. It also helps to enhance the stability of the overall structure and reduce the shaking that may occur during use, thereby improving the overall use experience and the durability of the device.

A part of the shell which defines the bottom wall groove 9 can be separated from the shell 1 to form a detachable structure. The structure where the cutting knife 4 is located can be easily disassembled, which is easy for maintenance and replacement. The detachable design allows only worn or damaged parts to be replaced without replacing the entire device, thereby reducing maintenance cost and time. In addition, the flexibility of the device is increased, and different cutting knives 4 can be replaced or other adjustments can be made as needed. The detachable structure allows the cutting knife 4 to be partially removed and stored when not in use, improving safety by reducing the risk of accidentally touching the blade.

The wrapper cutter also includes a vertical plate 7, which is installed on an outer wall of the shell 1 and is close to the second side edge 102. The vertical plate 7 extends above the first side edge 101 and partially covers the elongated slit 8, such that a gap is left between the vertical plate 7 and the elongated slit 8. The gap between the vertical plate 7 and the elongated slit 8 helps to control an introduction path of the section of paper 300 and reduce the deviation of the section of paper 300 during the cutting process. The vertical plate 7 can bend the section of paper 300 introduced into the elongated slit 8 into an arc-shaped surface, such that the section of paper 300 passing through the elongated slit 8 reaches a maximum stiffness and tension before reaching the blade of the cutting knife 4, It helps to improve the accuracy and stability of cutting and speed up the moving of the section of paper 300 passing through the elongated slit 8, thereby improving the cutting efficiency. The section of paper 300 is in a best state before cutting, which can reduce the occurrences of uneven cutting or breakage, thereby reducing the scrap rate. The arrangement of the vertical plate 7 allows the section of paper 300 to be smoothly introduced into the elongated slit 8, simplifies the operation process, and improves the convenience of operation. The vertical plate 7 can better control the introduction path of the section of paper 300, which can reduce the risk of accidental sliding of the section of paper 300 during operation and improve the safety of use. The vertical plate 7 has a first surface 71 facing the axially penetrating hollow structure and an opposing second surface 72 facing away from the axially penetrating hollow structure. A height of the vertical plate 7 extend along a circumferential direction of the shell 1. An upper edge 73 of the vertical plate 7 extends from an inner end 1021 of the second side edge 102 of the shell 1.

In some embodiments, the wrapper cutter also includes a fixed plate 6, which is arranged on the second side edge 102 close to the cutting knife 4. The fixed plate 6 is arranged on the second side edge 102 of the shell 1 and faces the first surface 71 of the vertical plate 7. The fixed plate 6 further narrows the width of the elongated slit 8 and prompts the section of paper 300 introduced into the elongated slit 8 to approach the first side edge 101. The design that prompts the section of paper 300 to approach the first side edge 101 helps to improve the cutting accuracy and reduce the deviation of the section of paper 300. By narrowing the width of the elongated slit 8, the stability of the section of paper 300 during the cutting process can be increased, the shaking of the section of paper 300 during cutting can be reduced, and the positioning of the section of paper 300 before cutting can be ensured to be accurate. Therefore, the occurrences of uneven cutting or breakage can be reduced, thereby reducing the scrap rate.

The first side edge 101 is defined with a first inclined guide edge 111 near an opening of the first end 10, and the first inclined guide edge 111 is inclined toward the elongated slit 8. The first inclined guide edge 111 gradually reduces the width of the elongated slit 8 from a top opening end of the elongated slit 8 inward, so as to facilitate the section of paper 300 to be introduced into the elongated slit 8 from the outside, such that the section of paper 300 can be introduced into the elongated slit 8 more smoothly by reducing obstacles during the introduction process, thus improving the cutting efficiency.

One end of the vertical plate 7 away from the cutting knife 4 is defined with a second inclined guide edge 112, and the second inclined guide edge 112 titles toward the elongated slit 8. The second inclined guide edge 112 makes it easier for the section of paper 300 to be introduced toward the direction of the cutting knife 4 in the elongated slit 8.

By providing the first inclined guide edge 111 and the second inclined guide edge 112, the convenience of introducing the section of paper 300 is improved, the positioning of the section of paper 300 during the introduction process is ensured to be more accurate, which helps to improve the cutting accuracy and reduce the deviation of the section of paper 300 during the cutting process. Therefore, the cutting efficiency is improved, the operating difficulty is reduced, the operating safety is improved, and scrap rate is reduced.

The first inclined guide edge 111 and the second inclined guide edge 112 cooperate to make the wrapper cutter more efficient, convenient and safe during use.

A bottom of the fixed plate 6 has a bottom edge 61 with a same slope as that of the blade of the cutting knife 4. The bottom edge 61, the blade of the cutting knife 4, the first side edge 101 and the second side edge 102 form an indwelling notch 5. The indwelling notch 5 has a rhombus cross-section. The bottom edge 61 has the same slope as that of the blade of the cutting knife 4, which helps to reduce the resistance during the cutting process and makes the cutting smoother. The indwelling notch 5 helps to control the introduction path of the section of paper 300, reduces the risk of accidental sliding of the section of paper 300, and improves the safety of cutting.

Embodiment 2

Figure 4:
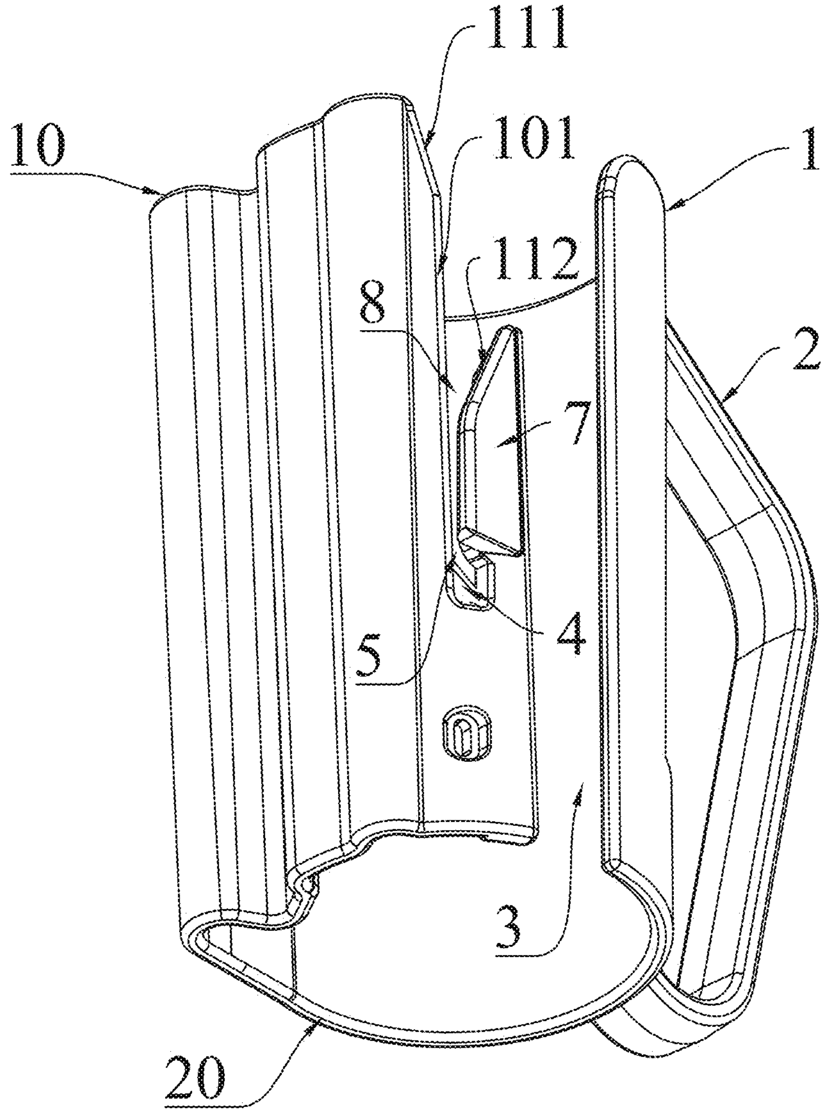
FIG. 4 is an overall schematic view of a wrapper cutter according to embodiment 2.
Figure 5:
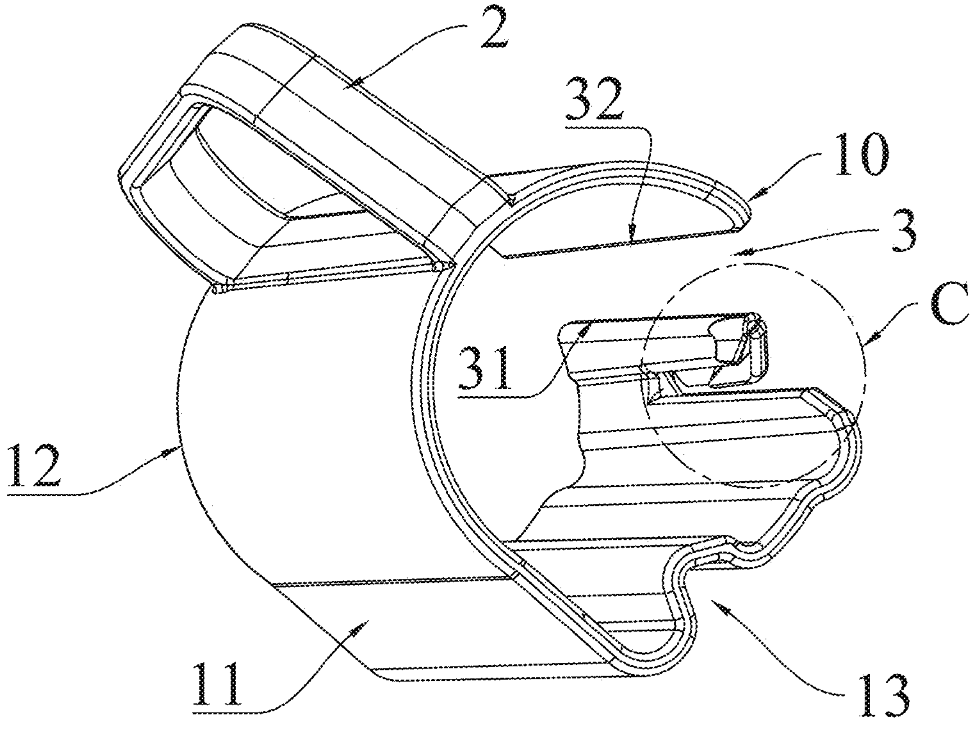
FIG. 5 is an internal schematic view of a shell of a wrapper cutter according to embodiment 2.
Figure 6:
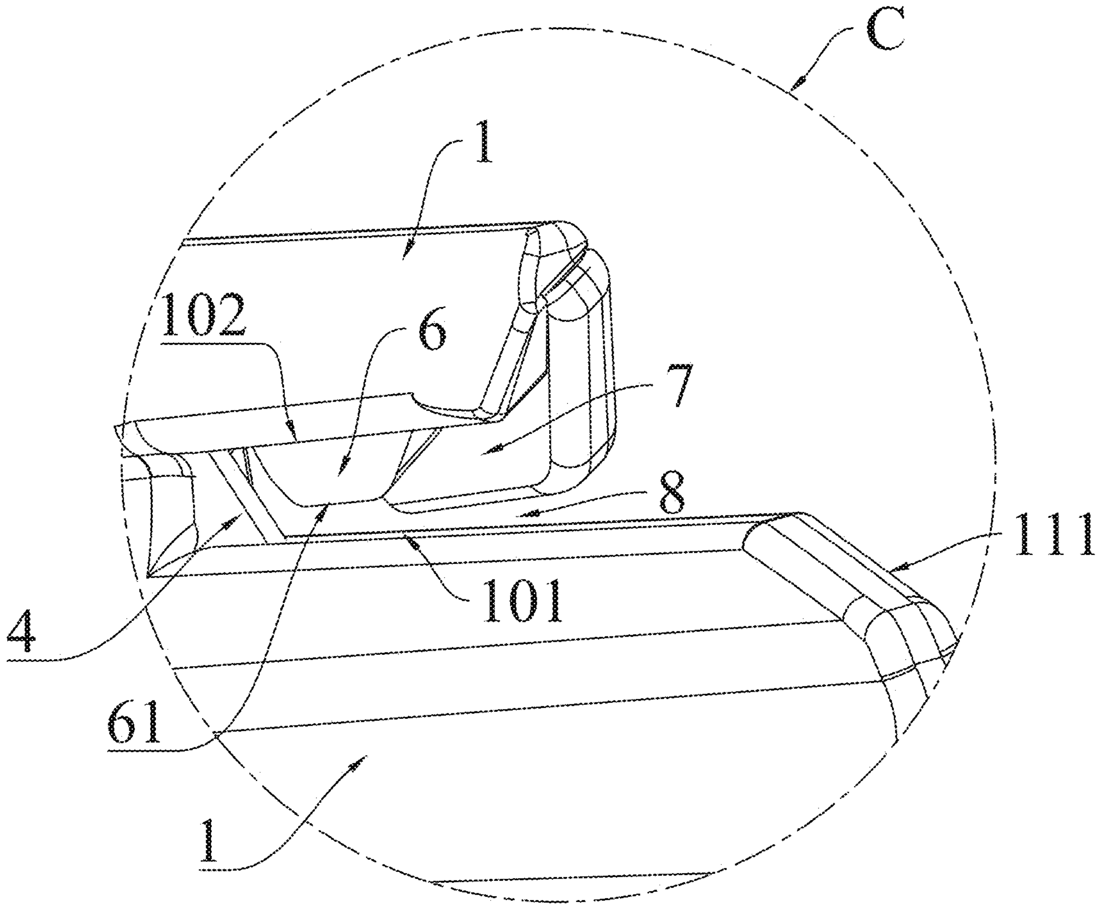
FIG. 6 is an enlarged schematic view of an elongated slit in area C of FIG. 5.
Figure 7:
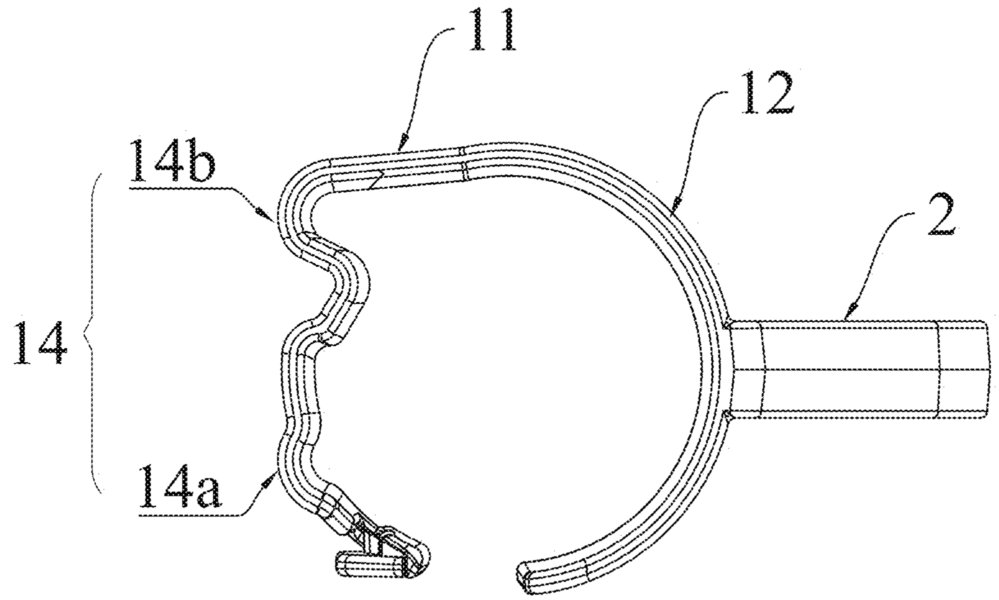
FIG. 7 is a top view of a wrapper cutter according to embodiment 3.
Figure 8:
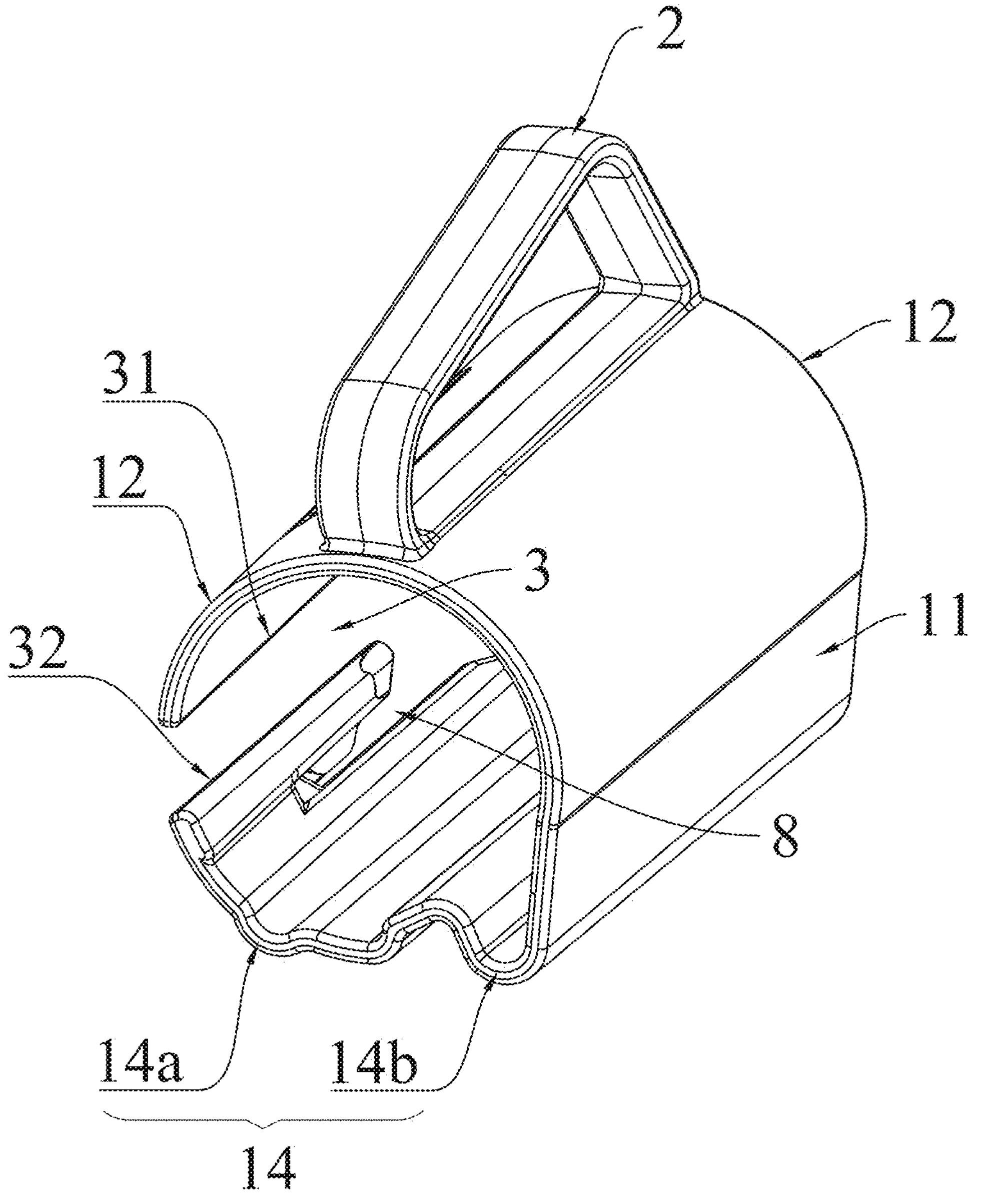
FIG. 8 is a perspective view of a wrapper cutter according to embodiment 3.
Figure 9:
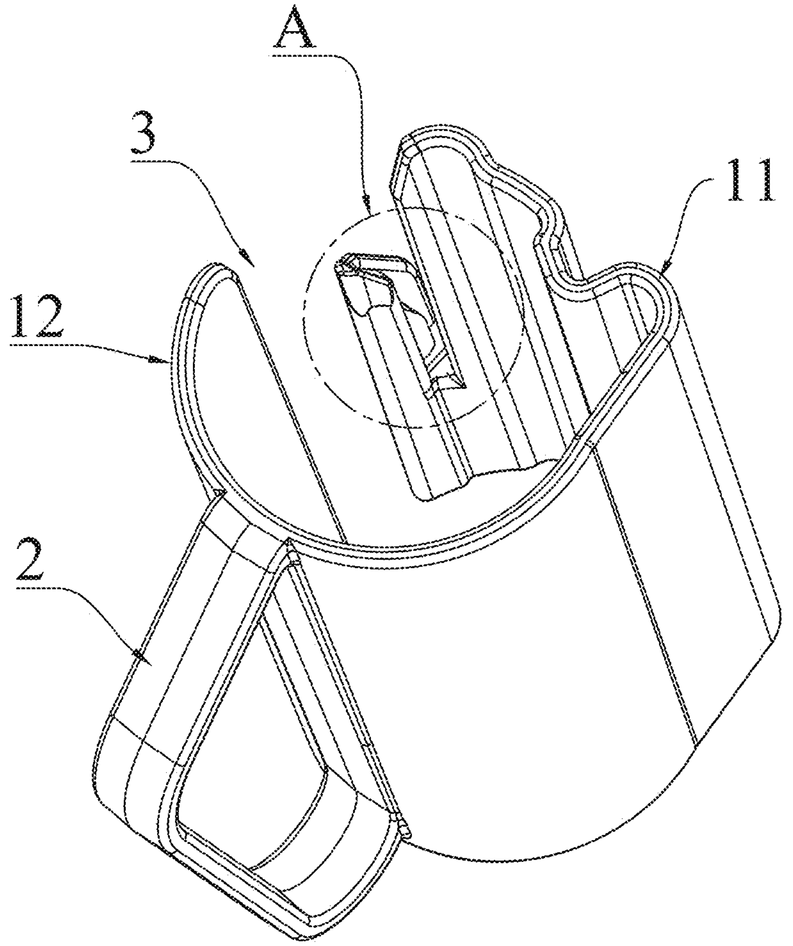
FIG. 9 is a perspective view of a wrapper cutter according to embodiment 3.
Figure 10:
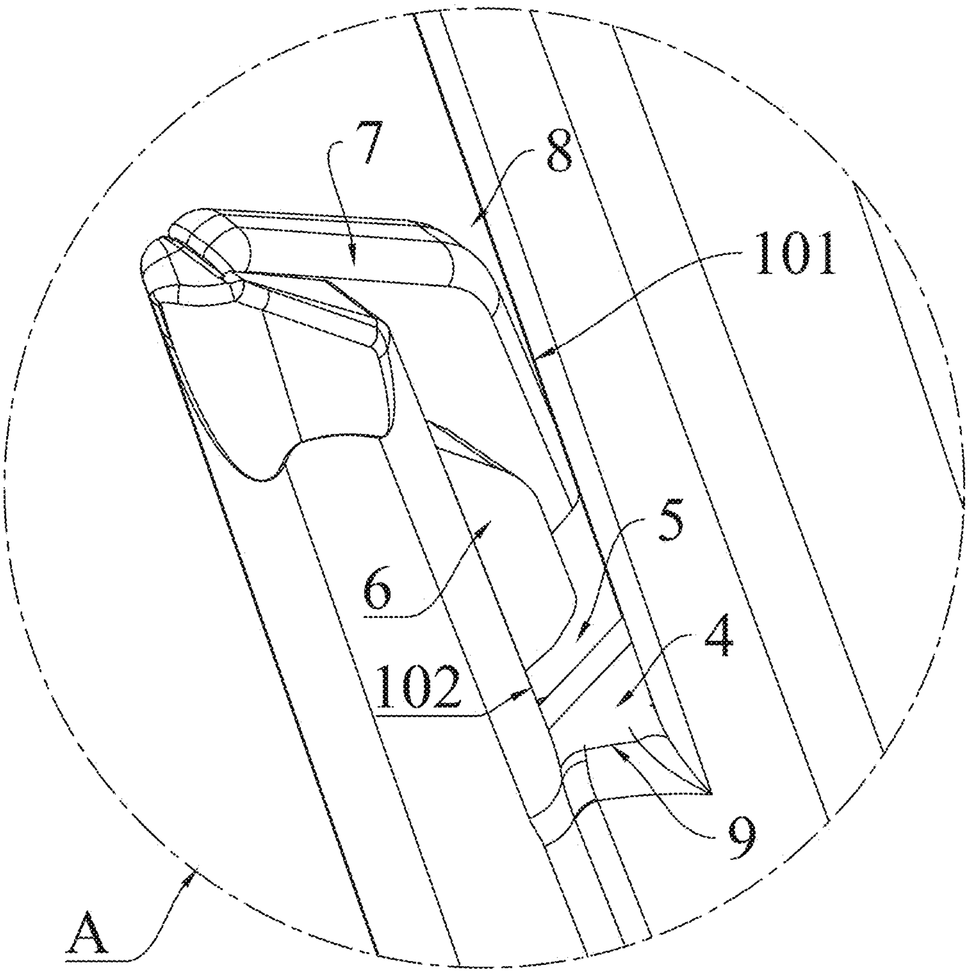
FIG. 10 is an enlarged schematic view of an elongated slit in area A shown in FIG. 9.
Figure 11:
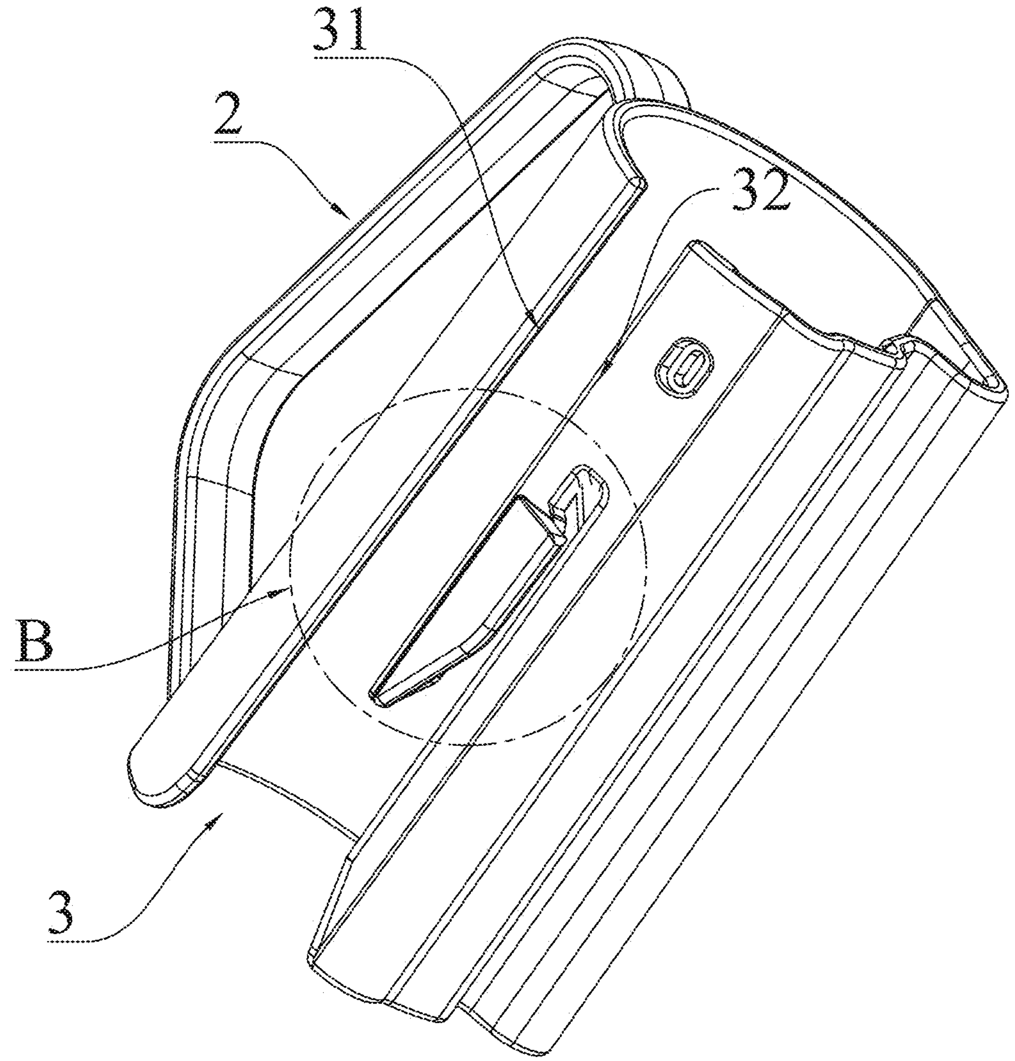
FIG. 11 is a perspective view of a wrapper cutter according to embodiment 3.
Figure 12:
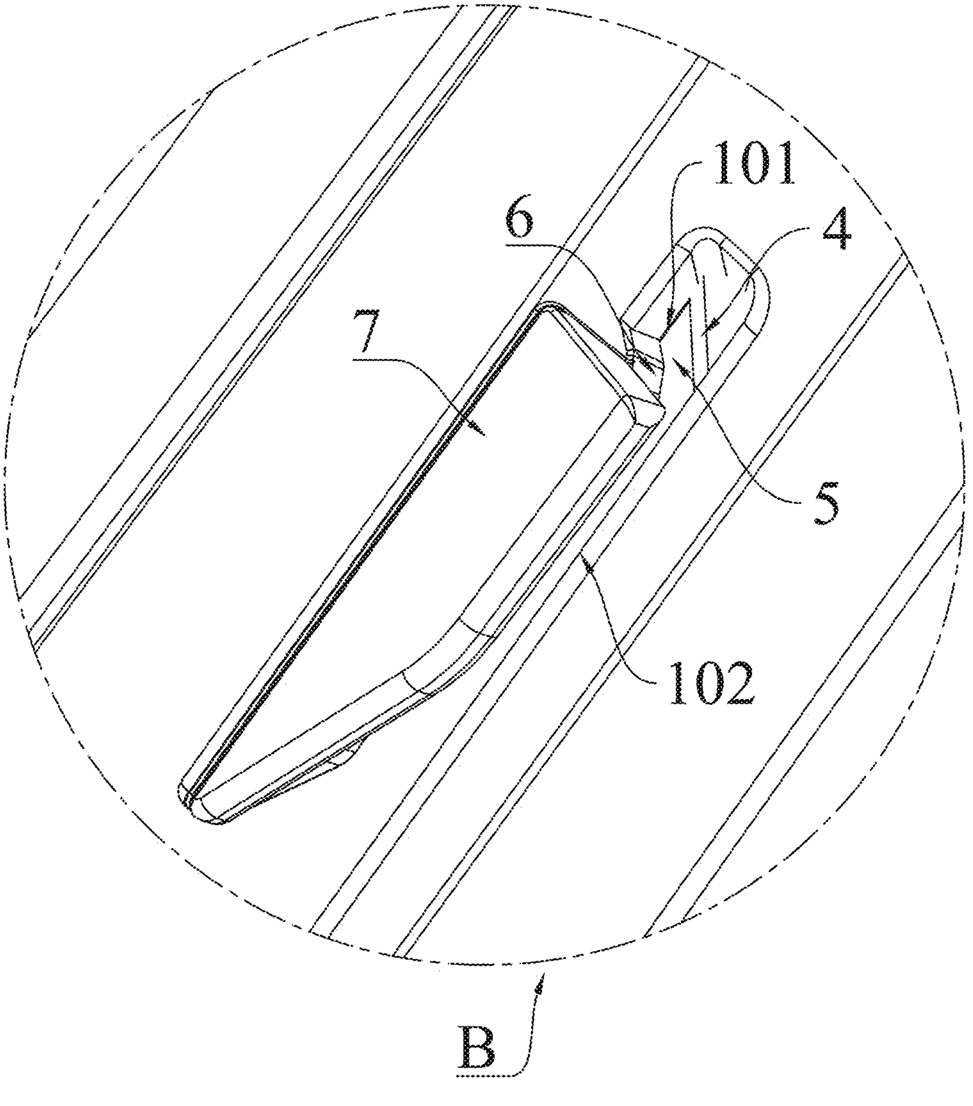
FIG. 12 is an enlarged schematic view of area B of the wrapper cutter shown in FIG. 11.

As shown in FIG. 4 to FIG. 6, a wrapper cutter is provided by the present disclosure. The shell 1 includes a first shell 11 and a second shell 12. A penetrating hollow structure of the second shell 12 can accommodate a rolled wrapping paper, and the shape and size of the penetrating hollow structure match the rolled wrapping paper. The shell 1, an elongated slit 8, a cutting knife 4, an indwelling notch 5 and a vertical plate 7 in embodiment 2 are the same as those in embodiment 1. Based on embodiment 1, embodiment 2 differs in that the shell 1 is defined with an open slot 3 extending axially along a sidewall of the shell 1 from a first end 10 to a second end 20. A side edge of the shell 1 beside the open slot 3 is defined with an elongated slit 8 extending axially, and a section of paper can be pulled out from the open slot 3 of the shell 1, and the length of the section of paper 300 can be chosen as needed.

The open slot 3 is in communication with the elongated slit 8, and the cutting knife 4 is fixedly arranged on an inner bottom wall of the elongated slit 8. As shown in FIG. 5, two side edges of the shell 1 corresponding to the open slot 3 are a third side edge 31 and a fourth side edge 32, respectively, and the third side edge 31 is configured for separating the section of paper when pulling out the wrapping paper from the penetrating hollow structure of the wrapper cutter.

Embodiment 3

As shown in FIG. 7 to FIG. 12, the first shell 11 includes a track structure with a polygonal cross-section, and the two parallel guideways 14 arranged on the shell 1 can be a guideway 14*a* and a guideway 14*b* arranged at intervals along its axial direction. The two guideways 14*a* and 14*b* are two protruded portions of the shell 1. Tangent lines of outer surfaces of the two protruded portions are coplanar.

Figure 13:
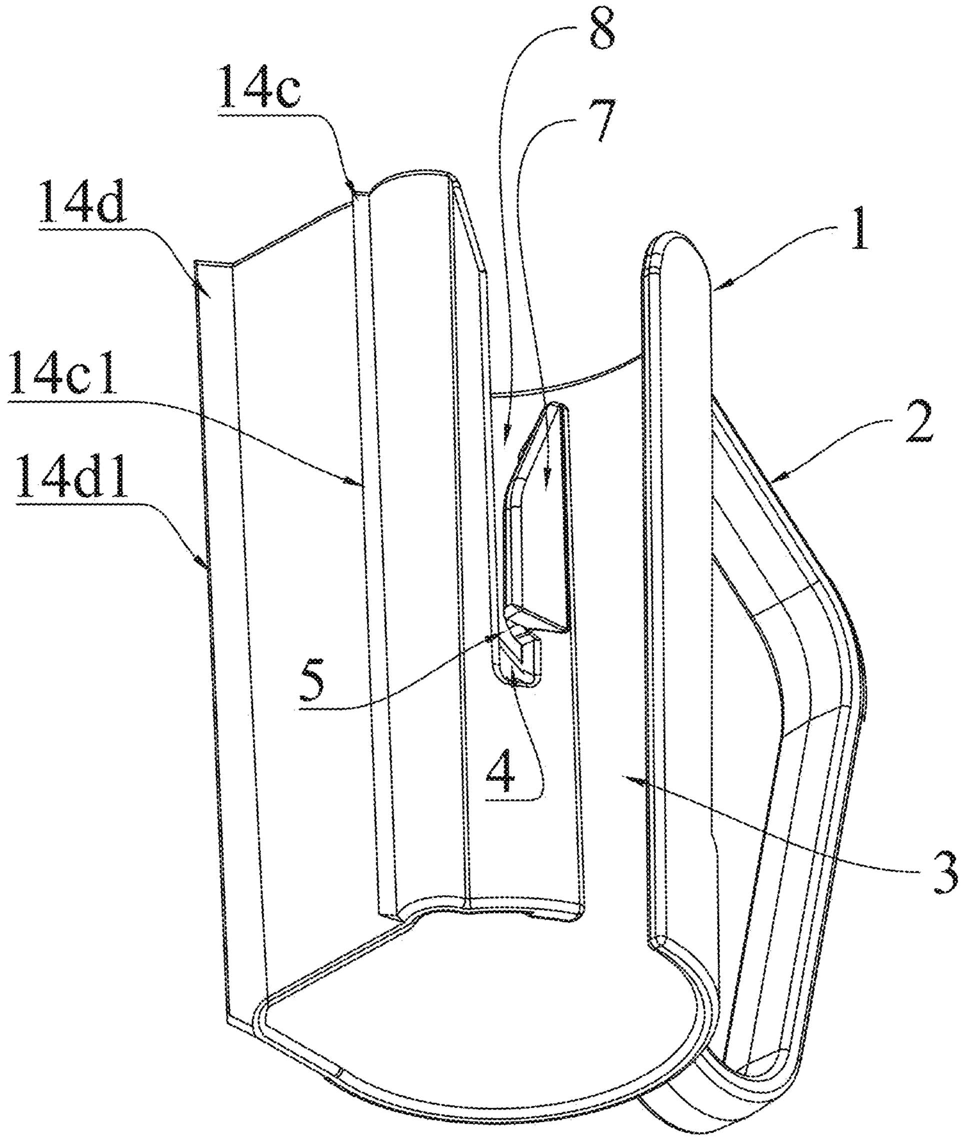
FIG. 13 is an overall schematic view of a wrapper cutter according to embodiment 3.

As shown in FIG. 13, the first shell 11 includes the parallel protrusions 14*c* and 14*d* protruding outwardly from the sidewall, and the protrusions 14*c* and 14*d* form a supporting structure 14, which can position and support the wrapper cutter and assist the wrapper cutter to slide smoothly.

As shown in FIG. 13, the protrusions 14*c* and 14*d* can be arranged parallel to an axis of the shell 1. Edges 14*c*1 and 14*d*1 of the two protrusions 14*c* and 14*d* are coplanar. When using the wrapper cutter, the two protrusions 14*c* and 14*d* form the supporting structure 14, which contacts the placement plane 100. A grip 2 is also provided on an outer wall of the shell 1. A plane formed by an axial symmetrical center line of the two protrusions 14*c* and 14*d* and an axial center line of the grip 2 is capable of passing through an axis of the shell 1. A force applying center on the grip 2 is perpendicular to the axial symmetrical center line formed by the two protrusions 14*c* and 14*d*, When cutting paper, the hand holds the grip 2 to push the wrapper cutter. The pressure applied by the grip 2 is perpendicular to the supporting structure 14 formed by the two protrusions 14*c* and 14*d* to keep the wrapper cutter cutting straight when cutting.

The elongated slit 8 is axially extended from the first end 10 to the second end 20 of the shell 1, Two side edges of the shell 1 defining the elongated slit 8 are a first side edge 101 and a second side edge 102, respectively. The cutting knife 4 is fixedly installed in an inner bottom wall of the shell 1, and the inner bottom wall of the shell 1 defines a bottom end of the elongated slit 8. The section of paper 300 of the wrapping paper can be inserted into the elongated slit 8 and can run to the cutting knife 4 for cutting. The vertical plate 7 is installed on an outer wall of the shell 1 close to the second side edge 102. The vertical plate 7 extends above the first side edge 101 and partially covers the elongated slit 8, leaving a gap formed therebetween. The vertical plate 7 can bend the section of paper 300 introduced into the elongated slit 8 into an are surface such that the section of paper 300 running through the elongated slit 8 can reach a maximum stiffness and tension.

The fixed plate 6 is arranged on the second side edge 102 close to the cutting knife 4. The fixed plate 6 further narrows the width of the elongated slit 8 and tends to prompt the section of paper 300 introduced into the elongated slit 8 to approach the first side edge 101. The sidewall of the shell 1 is also defined with an open slot 3, which extends from the first end 10 to the second end 20 of the shell 1. Two side edges of the shell 1 defining the open slot 3 are a third side edge 31 and a fourth side edge 32 respectively. The third side edge 31 can be configured to separate a section of paper when pulling out from the wrapper cutter. The first side edge 101 is defined with a first inclined guide edge 111 inclined toward the elongated slit 8 near an opening of the first end 10. The first inclined guide edge 111 gradually reduces the width of the elongated slit 8 from a top opening end of the elongated slit 8 inward, so as to facilitate the introduction of the section of paper 300 from the outside into the elongated slit 8 of the wrapper cutter, One end of the vertical plate 7 away from the cutting knife 4 is defined with a second inclined guide edge 112 inclined toward the elongated slit 8. The second inclined guide edge 112 facilitates the introduction of the section of paper 300 toward the direction of the cutting knife 4 within the elongated slit 8.

The indwelling notch 5 is provided at one side of the cutting knife 4, The fixed plate 6 is fixedly provided on one side of the first shell 11 close to the open slot 3, The fixed plate 6 is configured to bend the introduced section of paper 300 into an arc surface and the indwelling notch is formed between the fixed plate 6 and the cutting knife 4 such that the section of paper 300 passing through the cutting position can further reach a maximum stiffness and tension.

The first shell 11 is provided with a supporting structure 14, the supporting structure 14 defines a slope 13, and the slope 13 is configured to make a section of paper of the rolled wrapping paper abut against the cutting knife 4.

In the embodiments of the present disclosure, the rolled wrapping paper is introduced into the shell 1, and the fixed plate 6 bends a section of wrapping paper into an n-shaped arch, such that the section of wrapping paper reaches the maximum tension and hits the blade of the cutting knife 4 at an angle of 40 degrees to form a maximum lateral force. The indwelling notch 5, in cooperation with the first shell 11, is to allow the rolled wrapping paper to be bent into an n-shaped arch for a second time if it is not cut at the first time, and crawl along the rhombus space of the indwelling notch 5, and the cutting knife 4 continues to cut the rolled wrapping paper until cutting is finished. By arranging the first shell 11 of the shell 1 to a track structure with a polygonal cross-section, the shape of the second shell 12 of the shell 1 matches the shape of the rolled wrapping paper, which can clamp the rolled wrapping paper and fit the blade, such that the rolled wrapping paper reaches the maximum tension and achieves the best cutting effect.

A shape of the supporting structure 14 is similar to a sled, allowing it to slide in a straight line along the rolled wrapping paper. Since the rolled wrapping paper 200 is straight, the supporting structure 14 will only slide in a straight line, thereby ensuring that the cutting edge of the section of paper 300 is straight. The slope 13 is close to the sidewall of the second shell 12 and is inclined from a junction of the first shell 11 and the second shell 12 to the direction of the open slot 3. Since the rolled wrapping paper becomes smaller and smaller after use, with the help of the slope 13, rolled wrapping paper of different diameters, for example, a rolled wrapping paper with a diameter less than 5.5 cm, a section of paper can always abut against the blade during cutting, thereby achieving a best cutting effect.

Embodiment 4

Figure 14:
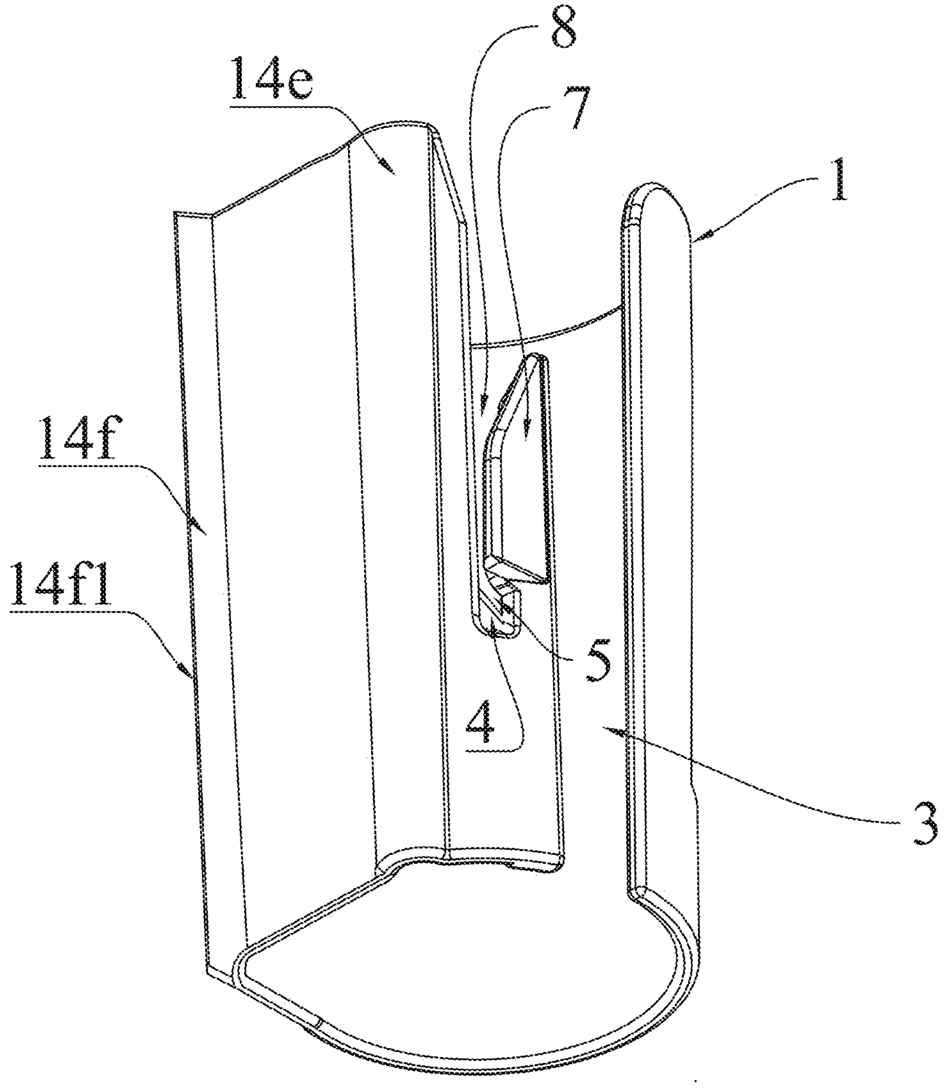
FIG. 14 is an overall schematic view of a wrapper cutter according to embodiment 4.

As shown in FIG. 14, the embodiments of the present disclosure provide a wrapper cutter, including: a shell 1 having a penetrating hollow structure axially; and an elongated slit 8 defined by the shell 1 along its axial direction. The elongated slit 8 extends from a first end 10 to a second end 20 of the shell 1. The elongated slit 8 is configured to have a width, thereby allowing the section of paper 300 to be easily accessed. Two sides of the elongated slit 8 are a first side edge 101 and a second side edge 102 of the shell 1, respectively. A cutting knife 4 is installed within the elongated slit 8, and the blade of the cutting knife 4 faces the first end 10 of the shell 1. It helps to reduce the risk of users accidentally touching the blade during use, thereby improving the safety of use. A supporting structure 14 is provided on an outer wall of the shell 1, as shown in FIG. 14. The supporting structure 14 can include a protrusion **14*f* and a curved portion 14*e*. An edge 14*f*1 of the protrusion 14*f* and a tangent line of the protruded portion 14*e* of the shell 1 are coplanar. The supporting structure 14 is not limited to implementation ways described in the embodiments. The supporting structure 14 is arranged on the outer wall of the shell 1 and in contact with the placement plane 100**.

The supporting structure 14 can be served for positioning and bearing the wrapper cutter, and assisting the wrapper cutter to slide straightly, ensuring that the section of paper 300 remains stable during the cutting process and reducing the deviation of the section of paper 300. Besides, the user can easily push the wrapper cutter, thereby improving the convenience of use. Additionally, the contact surface with the placement plane 100 is a plane, which helps to reduce the wear on the bottom of the wrapper cutter and improve durability. Through the combined effects of the structures in the above technical solution, the wrapper cutter is more efficient, accurate, safe and durable.

A vertical plate 7 is installed on an outer wall of the shell 1, and the vertical plate 7 extends along a circumferential direction of the shell 1 and at least partially covers the elongated slit 8, such that a gap is formed between the vertical plate 7 and the elongated slit 8 for the section of paper 300 to pass through. And the vertical plate 7 can bend the section of paper 300 passing through the elongated slit 8 into an arc surface between the elongated slit 8 and the vertical plate 7, such that the section of paper 300 passing through the elongated slit 8 reaches the maximum stiffness and tension before reaching the blade of the cutting knife 4.

Embodiment 5

Figure 15:
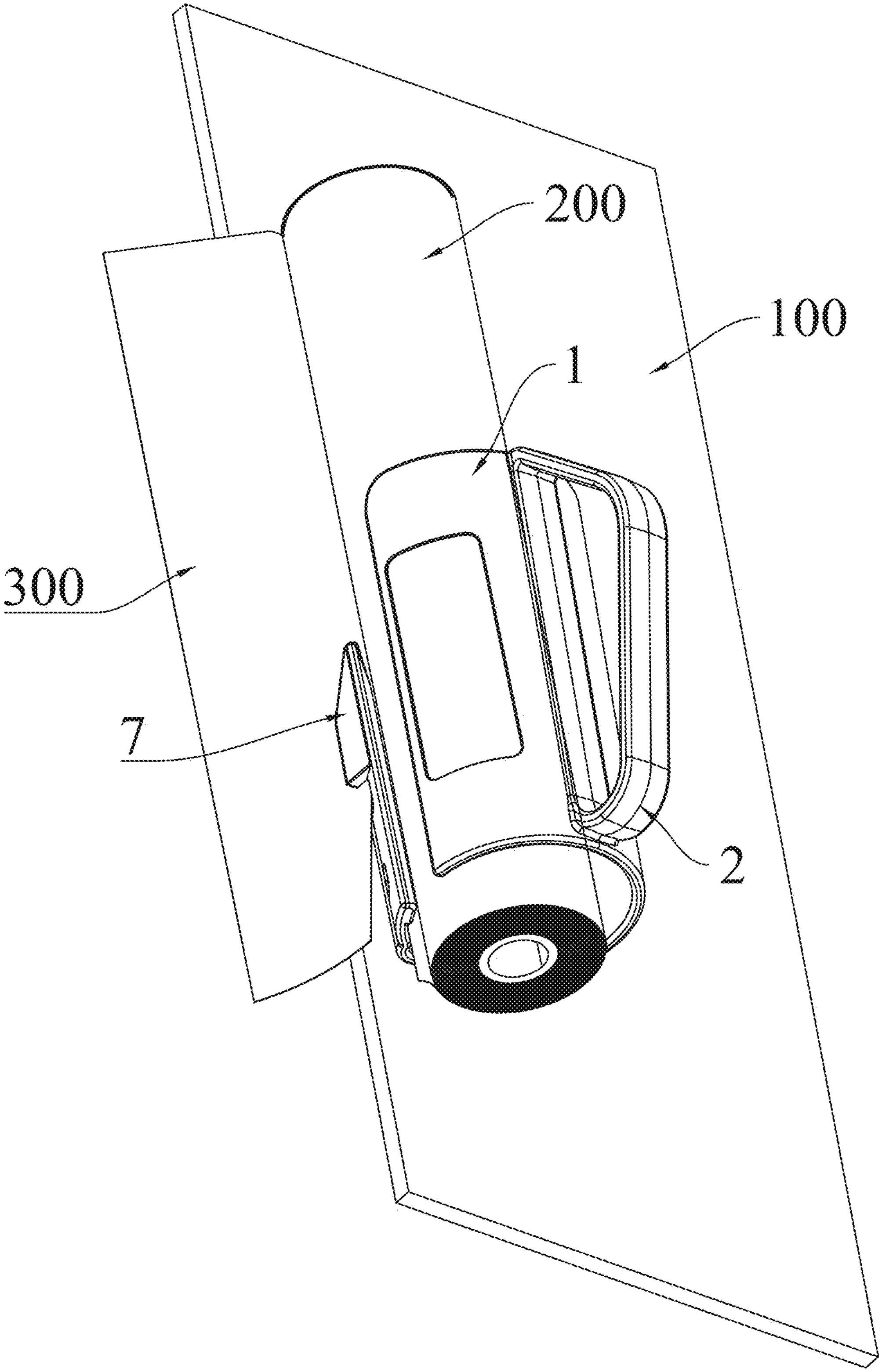
FIG. 15 is a schematic view of the wrapper cutter cutting paper according to embodiment 5.
Figure 16:
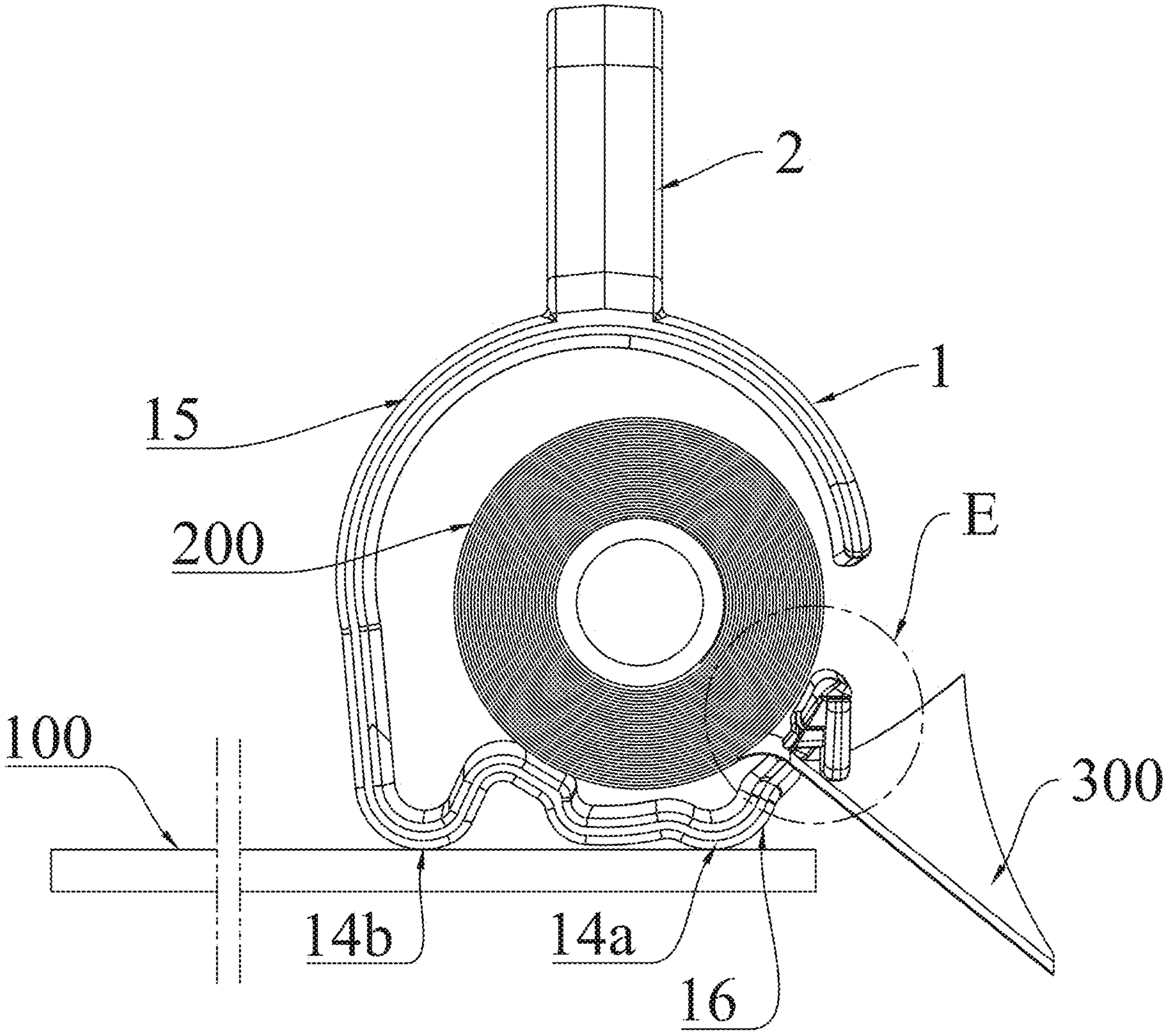
FIG. 16 is a schematic view of the wrapper cutter in the process of cutting a section of paper according to embodiment 5.
Figure 17:
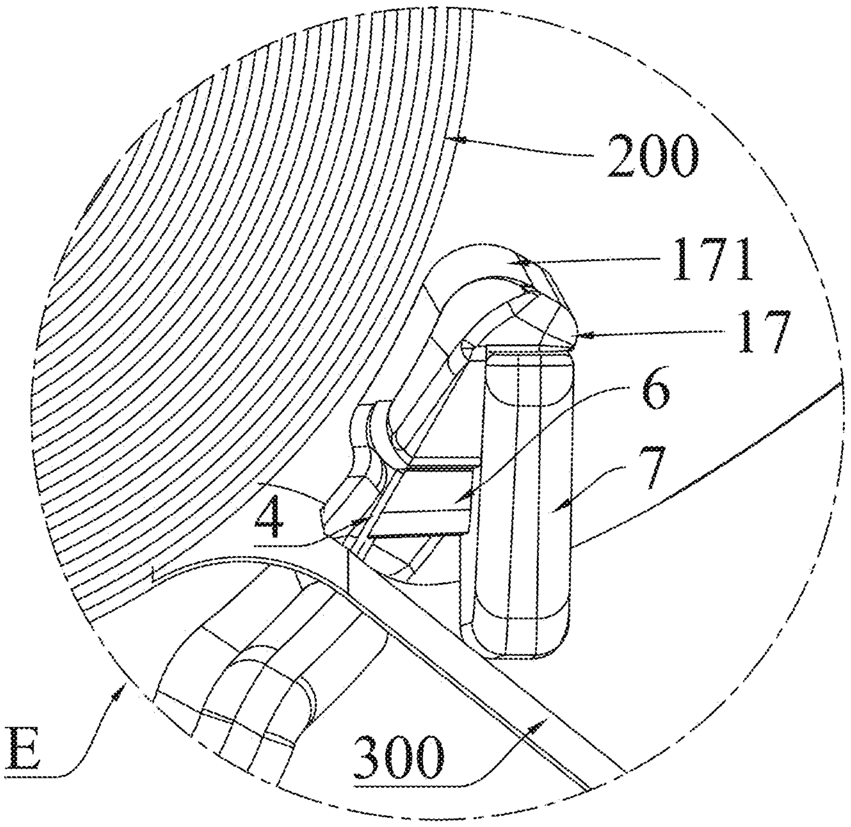
FIG. 17 is an enlarged schematic view of the cutting structure of area E of FIG. 16.

As shown in FIG. 15 and FIG. 17, the wrapper cutter provided by the embodiments of the present disclosure shares the same connecting manner of the shell 1, the first end 10 and the second end 20 of the shell 1, the elongated slit 8, the cutting knife 4 and the supporting structure 14 as those of embodiment 4, A grip 2 is also fixedly connected to an outer wall of the shell 1, and a force center of the grip 2 is perpendicular to the axial symmetrical center line between the two guideways **14*a* and 14*b*. When cutting paper, hold the grip 2 and push the wrapper cutter, Pressure applied by the grip 2 is perpendicular to the supporting structure 14 or the placement plane 100 which is formed by the two guideways 14*a* and 14*b* so as to keep the wrapper cutter cutting in a straight line. It helps the user to more easily grasp the balance of the wrapper cutter during use, making the pushing the wrapper cutter more natural and smoother, improving the convenience of use, ensuring that the section of paper 300 remains stable during the cutting process, reducing the deviation of the section of paper 300, and improving the cutting accuracy. Additionally, the wrapper cutter can be kept stable, the risk of accidental sliding can be reduced, and the safety of use can be improved. The shell includes an upper portion 15 and a lower portion 16, the upper portion 15 and the lower portion 16 define an axially penetrating hollow structure. The grip 2 is arranged on the upper portion 15 of the shell 1. The lower portion 16 includes a lip 17 having a curved surface 171, the vertical plate 7 is arranged below the lip 17 of the lower portion 16 of the shell 1 and extends toward a direction away from the upper portion 15 of the shell 1**.

The working principle of the present disclosure is as follows.

Before cutting, a section of paper of the rolled wrapping paper 200 to be cut is extracted to pass through the open slot 3, and another side of the open slot 3 without the cutting knife is configured to position and determine the width of the section of paper to be cut. After that, the rolled wrapping paper can be axially pulled out and then the section of paper can be placed in the elongated slit 8 for cutting.

The wrapper cutter guides a section of paper of the rolled wrapping paper into the elongated slit 8 of the shell 1 and bends the section of paper into an arc shape through the vertical plate 7 and the fixed plate 6, such that the section of paper reaches the maximum tension and hits the blade of the cutting knife 4 at an angle of 40 degrees to form a maximum lateral force. The indwelling notch 5, in cooperation with the vertical plate 7 and the first shell 11, is to allow the section of paper of the rolled wrapping paper to be bent into an n-arch shape for the second time if the section of paper is not cut at the first time, thus the cutting knife 4 continues to cut the section of paper along the rhombus space of the indwelling notch 5 until the rolled wrapping paper is cut, By arranging the supporting structure 14, the cutting line of the section of paper 300 can be a straight line, By arranging the slope 13, the section of paper of the rolled wrapping paper of different diameters can always be close to the blade when cutting, to achieve the best cutting effect. Put the wrapper cutter close to a desktop and push the wrapper cutter along the direction of the rolled wrapping paper, and the rolled wrapping paper can be easily and perfectly cut.

The above description is only some embodiments of the present disclosure and is not intended to limit the present disclosure. For those of ordinary skill in the art, the present disclosure may have various modifications and variations. Any modification, equivalent replacement, improvement, etc. made within the spirit and principle of the present disclosure shall be included in the protection scope of the present disclosure.

The invention claimed is:

1. A wrapper cutter, comprising:

a shell having an axially penetrating hollow structure;

an elongated slit extending from a first end of the shell along an axial direction of the shell, and the elongated slit formed between a first side edge and a second side edge of the shell;

a cutting knife fixedly arranged within the elongated slit, wherein a blade of the cutting knife faces the first end of the shell, and the cutting knife is configured to cut a section of paper passing through the elongated slit;

a vertical plate arranged on an outer wall of the shell, the vertical plate having a first surface facing the axially penetrating hollow structure and an opposing second surface facing away from the axially penetrating hollow structure, a height of the vertical plate extending along a circumferential direction of the shell, an upper edge of the vertical plate extending from an inner end of the second side edge of the shell, and the vertical plate at least partially covering the elongated slit to allow a gap formed between the vertical plate and the elongated slit for the section of paper to pass through; and a fixed plate arranged on the second side edge of the shell and facing the first surface of the vertical plate; wherein the fixed plate narrows a width of the elongated slit and prompts the section of paper introduced into the elongated slit to approach the first side edge in a process of approaching the cutting knife.

2. The wrapper cutter according to claim 1, wherein a grip is further arranged on the outer wall of the shell.

3. The wrapper cutter according to claim 1, wherein a sidewall of the shell is defined with an open slot extending from the first end of the shell to a second end of the shell, two sides of the shell defining the open slot are a third side edge and a fourth side edge respectively, and the third side edge or the fourth side edge is configured to pull the section of paper out of the wrapper cutter.

4. The wrapper cutter according to claim 1, wherein the first side edge facing an opening of the first end is defined with a first inclined guide edge, and the first inclined guide edge tilts toward the elongated slit; the first inclined guide edge narrows a width of the elongated slit from a top opening end of the elongated slit inward, so as to facilitate introducing the section of paper from outside into the elongated slit of the wrapper cutter.

5. The wrapper cutter according to claim 1, wherein one end of the vertical plate away from the cutting knife is defined with a second inclined guide edge, the second inclined guide edge tilts toward the elongated slit, and the second inclined guide edge facilitates the section of paper to be introduced toward the cutting knife within the elongated slit.

6. The wrapper cutter according to claim 1, wherein one protrusion is arranged on a sidewall of the shell, and the sidewall of the shell comprises a protruded portion, an edge of the protrusion and a tangent line of the protruded portion of the sidewall of the shell are coplanar.

7. The wrapper cutter according to claim 1, wherein two guideways are arranged at intervals, the two guideways are arranged parallel to an axis of the shell, and the two guideways are two protruded portions of the shell.

8. The wrapper cutter according to claim 7, wherein tangent lines of outer surfaces of the two protruded portions are coplanar.

9. The wrapper cutter according to claim 1, wherein two protrusions are arranged on a sidewall of the shell, and edges of the two protrusions are coplanar.

10. The wrapper cutter according to claim 1, further comprising:

an indwelling notch, wherein a lower edge of the fixed plate has a same slope as that of the blade of the cutting knife; and the lower edge, the blade of the cutting knife, the first side edge and the second side edge form the indwelling notch.

11. The wrapper cutter according to claim 10, wherein the indwelling notch has a rhombus cross-section.

* * * * *